Patented July 15, 1952

2,603,658

UNITED STATES PATENT OFFICE 2,603,658

PRODUCTION OF GAMMA-SULFONYL CARBOXYLIC ACIDS

Fritz Hanüsch, Ludwigshafen-on-the-Rhine, Germany

No Drawing. Application March 17, 1951, Serial No. 216,249. In Germany April 13, 1950

6 Claims. (Cl. 260—515)

This invention relates to a process of producing gamma-sulfonyl carboxylic acids.

I have found that gamma-sulfonyl carboxylic acids are obtained in good yields in the form of their salts by reacting aliphatic gamma-lactones with salts of sulfinic acids.

Suitable initial materials are on the one hand, for example, gamma-butyrolactone and its alkyl, aryl or alkoxy substitution products, and on the other hand the sodium, calcium, zinc or potassium salts of benzene sulfinic acid or its homologues, halogen or alkoxy substitution products, of methyl-, ethyl-, butyl-, decyl- or cycloalkyl-sulfinic acids or mixtures of such sulfinic acids such as can be prepared for example by reducing the sulfochloride-like reaction products of chlorine and sulfur-dioxide on saturated hydrocarbons.

The reaction proceeds, for example when using gamma-butyrolactone and the sodium salt of benzene sulfinic acid, according to the following scheme:

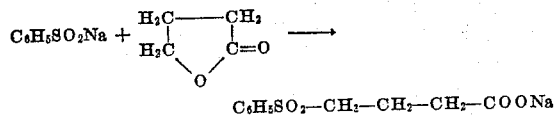

It is preferable to work so that the components act on each other for several hours, preferably while heating, for example at 150° to 250° C. The co-employment of solvents or diluents is desirable in many cases; for this purpose it is preferable to employ an excess of the lactone. The use of increased pressure is generally speaking unnecessary.

The free gamma-sulfonyl carboxylic acids are obtained from the reaction mixture for example by dissolution in water and precipitation with mineral acids.

The compounds which are thus readily accessible according to the present invention are valuable intermediate products, for example for the dyestuff and pharmaceutical industries.

The following examples will further illustrate this invention but the invention is not restricted to these examples. The parts are by weight.

Example 1

388 parts of the sodium salt of benzene sulfinic acid and 344 parts of gamma-butyrolactone are heated at 180° to 200° C. for 4 to 6 hours while stirring. The cooled solid mass is dissolved in water, acidified with hydrochloric acid and the resulting crystals filtered off by suction. 350 parts of gamma-benzenesulfonylbutyric acid are obtained which after recrystallisation from benzene melts at 90° to 93° C.

Example 2

A mixture of 344 parts of gamma-butyrolactone and 402 parts of para-toluene sulfinic acid sodium salt are heated for 16 hours at 200° C. as in Example 1. A good yield of gamma-(para-toluenesulfonyl)-butyric acid is obtained which after recrystallisation from alcohol melts at 105° to 108° C.

Example 3

A sulfochloride mixture obtained by the action of chlorine and sulfur dioxide in short-wave light on a mixture of paraffin hydrocarbons having a boiling range of 250° to 320° C. is converted into a mixture of sulfinic acids in the usual way with zinc dust and hydrochloric acid. 100 parts of this sulfinic acid mixture is neutralised with 27 parts of 50% caustic soda solution. The water formed is distilled off under reduced pressure and 30 parts of gamma-butyrolactone are added to the salt-like residue.

The mixture is heated to 200° C. for 16 hours while stirring. The cooled melt is dissolved in 200 parts of water, acidified with hydrochloric acid and the resulting mixture of gamma-alkyl-sulfonylbutyric acids shaken up with benzene. After drying and distilling off the benzene, there remain 60 parts of an oil which is readily soluble in soda solution and alcohol, which has an acid value of 143 and which has a mean molecular weight of 390. It contains 65.08% of carbon, 10.75% of hydrogen and 7.9% of sulfur.

What I claim is:

1. A process for the production of gamma-sulfonyl carboxylic acids which consists in reacting salts of sulfinic acids with aliphatic gamma-lactones.

2. A process for the production of gamma-aryl-sulfonyl carboxylic acids which consists in heating salts of aromatic sulfinic acids with gamma-butyrolactones to temperatures between 150 and 250° C.

3. A process for the production of gamma-phenyl-sulfonyl-butyric acid which consists in heating the sodium salt of benzene sulfinic acid with an excess of gamma-butyrolactone to temperatures between 180 and 200° C. and acidifying the reaction mixture after dissolving it in water.

4. A process for the production of gamma-(para-toluene-sulfonyl)-butyric acid which consists in heating the sodium salt of para-toluene sulfinic acid with an excess of gamma-butyrolactone to temperatures between 180 and 200° C. and acidifying the reaction mixture after dissolving it in water.

5. A process for the production of gamma-alkyl-sulfonyl carboxylic acids which consists in heating salts of aliphatic sulfinic acids with gamma-butyrolactones to temperatures between 150 and 250° C.

6. A process for the production of a mixture of gamma-alkyl-sulfonyl-butyric acids which consists in heating a mixture of the sodium salts of sulfinic acids, obtained by reacting chlorine and sulfur-dioxide in short-wave light on a mixture of paraffin hydrocarbons of a boiling range between 250 and 320° C. and reducing the mixture of sulfochlorides so obtained by zinc dust and hydrochloric acid, with an excess of gamma-butyrolactone to temperatures between 180 and 200° C. and acidifying the reaction mixture after dissolving it in water.

FRITZ HANÜSCH.

REFERENCES CITED

The following references are of record in the file of this patent:

FOREIGN PATENTS

| Number | Country | Date |
|---|---|---|
| 676,013 | Germany | May 26, 1939 |

OTHER REFERENCES

Johansson, Chem. Zentr., vol. 1916 II, p. 558.
Schjanberg, Chem. Abstracts, vol. 37, Col. 5704 (1943).
Rapoport et al., Chem. Abstracts, vol. 41, Col. 4103 (1947).